United States Patent [19]
Dong

[11] Patent Number: 5,696,897
[45] Date of Patent: Dec. 9, 1997

[54] METHOD AND APPARATUS FOR A MULTI-LAYER SYSTEM QUIESCENT SUSPEND AND RESUME OPERATION

[75] Inventor: Clark Dong, Saratoga, Calif.

[73] Assignee: Sun Microsystems, Inc., Mountain View, Calif.

[21] Appl. No.: 189,417

[22] Filed: Jan. 31, 1994

[51] Int. Cl.$^6$ .................................................. G06F 11/00
[52] U.S. Cl. ............... 395/182.13; 395/652; 395/182.21; 395/182.22
[58] Field of Search .................... 395/650, 700, 395/182.13, 652, 182.21, 182.22; 364/280, 281.3, 281.4, 281.2, 281.8

[56] References Cited

U.S. PATENT DOCUMENTS

| | | | |
|---|---|---|---|
| 4,395,757 | 7/1983 | Bienvenu et al. | 364/DIG. 1 |
| 5,093,915 | 3/1992 | Platterer et al. | 395/700 |
| 5,155,842 | 10/1992 | Rubin | 395/575 |
| 5,312,752 | 5/1994 | Jewett et al. | 395/750 |

FOREIGN PATENT DOCUMENTS

| | | | |
|---|---|---|---|
| A-0516159 | 12/1992 | European Pat. Off. | G06F 11/14 |
| A-0518623 | 12/1992 | European Pat. Off. | G06F 9/445 |
| WO-A9207321 | 4/1992 | WIPO | G06F 11/00 |

OTHER PUBLICATIONS

Deitel; *Operating Systems;* Addison-Wesley; 1990.
Silbershatz, et al.; *Operting System Concepts*; Addison-Wesley; 1994.
Article from Hitachi; Hitach Review, v 36. n4; 1987, pp. 197–200.

*Primary Examiner*—Lucien U. Toplu
*Attorney, Agent, or Firm*—Blakely Sokoloff Taylor & Zafman

[57] ABSTRACT

The state of a functioning computer operating system is quickly stored onto a nonvolatile storage device such that the computer system may be suspended quickly. To quickly save the state of computer operating system, a process firsts prepares for the computer system suspend by allocating a file on the root file system that will store operating system state data. The process then warns each user application process running on the computer system to allow each user application process to prepare for the suspend. After the warning, the process suspends each user application process. The memory space used by each user application process is then swapped out to nonvolatile storage. Next, the various kernel daemons and operating system subsystems are suspended. Finally the process suspends the device drivers running on the computer system such that there is no activity in the computer system. A compressed version of the operating system state is then written to a nonvolatile storage device. To resume operation of the suspended computer system, the steps are performed in the reverse order.

21 Claims, 7 Drawing Sheets

METHOD AND APPARATUS FOR A MULTI-LAYER SYSTEM QUIESCENT SUSPEND AND RESUME OPERATION

FIELD OF THE INVENTION

This invention relates to the field of computer operating systems. Specifically, the invention relates to a fast computer system suspend operation and a corresponding resume operation that restores the computer system to the state the computer system was in before it was suspended.

BACKGROUND OF THE INVENTION

Portable computer devices are commonly used for very short periods of time. For example, a user may work on a portable computer system for only ten minutes while waiting to board an airplane at an airport. Since the portable computer is often used for such a short period of time, it is desirable to have very short boot up and shut down times for the portable computer system.

Existing portable personal computer systems use different techniques for reducing the amount of time required to boot up or shut down. FIG. 1a illustrates a first popular technique wherein the portable computer system is suspended by halting the processor, and the system state is maintained by constantly refreshing the dynamic random access (DRAM) main memory using a small amount of power from a battery system. FIG. 1b illustrates another popular technique of temporarily shutting down a portable computer system where the contents of the DRAM main memory are written to a non volatile storage system. Referring to FIG. 1a, the processor of the portable computer system is halted and then the entire content of the main memory is written to a nonvolatile storage device, such as a hard disk drive. However, both of these techniques create various problems.

In the first technique, as illustrated in FIG. 1a, the portable computer system's processor is halted and the content of the DRAM main memory is refreshed using a battery system such that all devices outside of area 29 receive no power. The technique of FIG. 1a still requires battery power from battery 28 to keep the main memory refreshed. Thus, the memory refresh technique of FIG. 1a can only work for a limited time duration, and when the power in battery 28 is eventually depleted, all the system state information stored in the DRAM main memory will be lost.

The second technique, as illustrated in FIG. 1b, consists of a brute force memory dump operation. In this brute force technique, the entire contents of the computer system's main memory 27 is written to a nonvolatile storage device such as a hard disk drive 25. Writing the entire contents of the main memory 27 onto a hard disk 25 requires a large dedicated disk partition that is reserved only for storing the entire contents of main memory 27. Furthermore, the memory dump technique does not always operate properly. If the system shuts down when a user application process or a system thread is in a state where it should not be halted, the user application or system thread might not operate after the user attempts to resume the system.

It is therefore desirable to have a fast suspend operation that brings the computer system into a quiescent state before storing the information into nonvolatile memory. As will be described in the detailed description, the present invention provides for a multi-layer computer system quiescent suspend operation that suspends all activity in the computer system before saving the computer system state onto nonvolatile storage. A corresponding resume operation is also defined that restores the state of computer system and restarts the suspended activities.

SUMMARY OF THE INVENTION

The present invention provides a method and apparatus that suspends all activity in a computer system rapidly and saves the state of computer operating system such that the computer system may be suspended quickly. To rapidly save the state of computer operating system, the method of the present invention first prepares for the computer system suspend by allocating a file on the root file system that will store operating system state data. The method also swaps out the memory space used by each user application process onto nonvolatile storage to reduce the amount of memory that must be saved later. The method then warns each user application process running on the computer system about the impending suspend. After each user application is warned and given a chance to prepare for the suspend, each user application process is then suspended. Next, the various kernel daemons and operating system subsystems are suspended. Finally, each device driver running on the computer system is instructed to save the state of associated hardware devices. After saving the associated hardware device state, each device driver is suspended such that there is no longer any activity in computer system. A compressed version of the operating system state is then written to a nonvolatile storage device.

To resume operation of the suspended computer system, similar steps are performed in the reverse order. First, the computer system state that was stored onto a nonvolatile storage device is read back into main memory. Each of the device drivers are then reactivated. Each device driver restores the state of its associated hardware device. Next, the various kernel daemons and operating system subsystems are reactivated. Finally, each user application process is reactivated and informed that the computer system was just brought back up from a rapid suspend.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

NOTION AND NOMENCLATURE

Figure 1A:
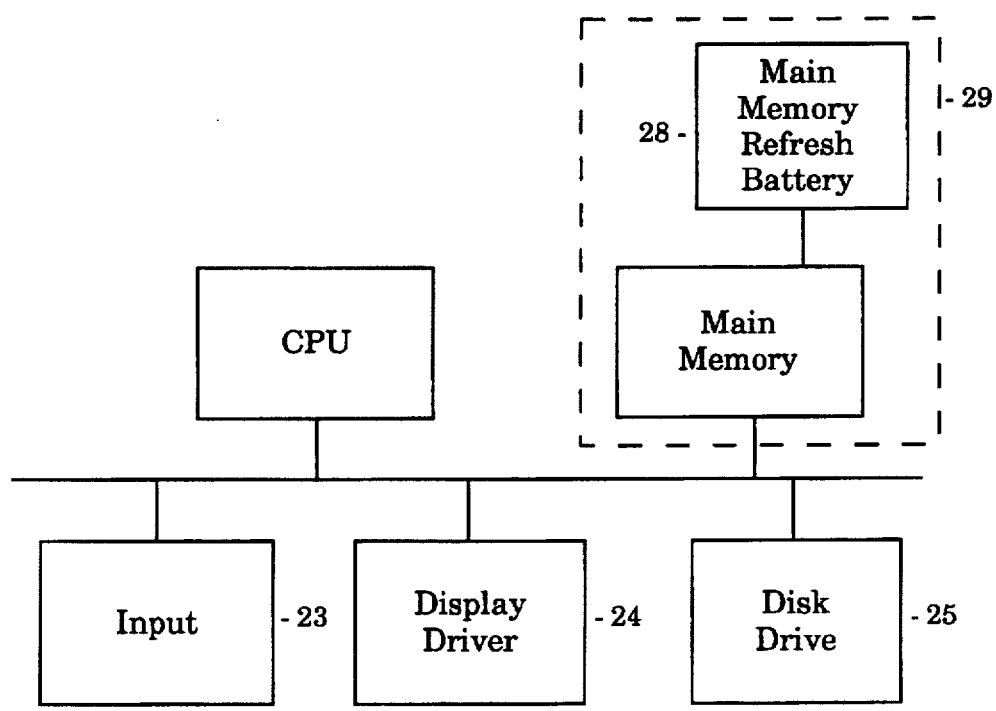
FIG. 1a illustrates a shut down procedure where the information in the main memory is refreshed using a battery.
Figure 1B:
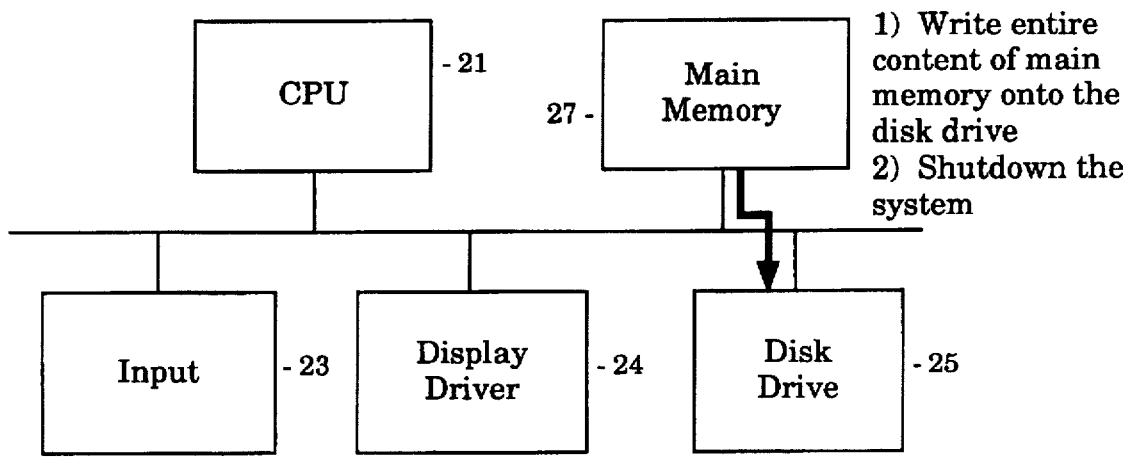
FIG. 1b illustrates a shut down procedure where all the information in the main memory is written to a nonvolatile storage device.

The detailed descriptions which follow are presented largely in terms of algorithms and symbolic representations of operations within a computer system. These algorithmic descriptions and representations are the means used by those skilled in the data processing arts to convey the substance of their work most effectively to others skilled in the art.

Generally, and within the context of this application, an algorithm is conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, a distinction is maintained between the method operations in operating a computer and the method of computation itself. The present invention relates to method steps for operating a computer in processing electrical or other physical signals (e.g., mechanical, chemical) to generate other desired physical signals.

The present invention also relates to apparatus for performing these operations. This apparatus may be specially constructed for the required purposes, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION

Methods and apparatus for a multi-layer system suspend and resume operation are disclosed. In the following description, for purposes of explanation, specific nomenclature is set forth to provide a thorough understanding of the present invention. However, it will be apparent to one skilled in the art that these specific details are not required to practice the present invention. For example, the present invention is explained with reference to the UNIX operating system. However, the teachings of the present invention can be used in other multi-process operating systems.

A Computer System

Figure 2:
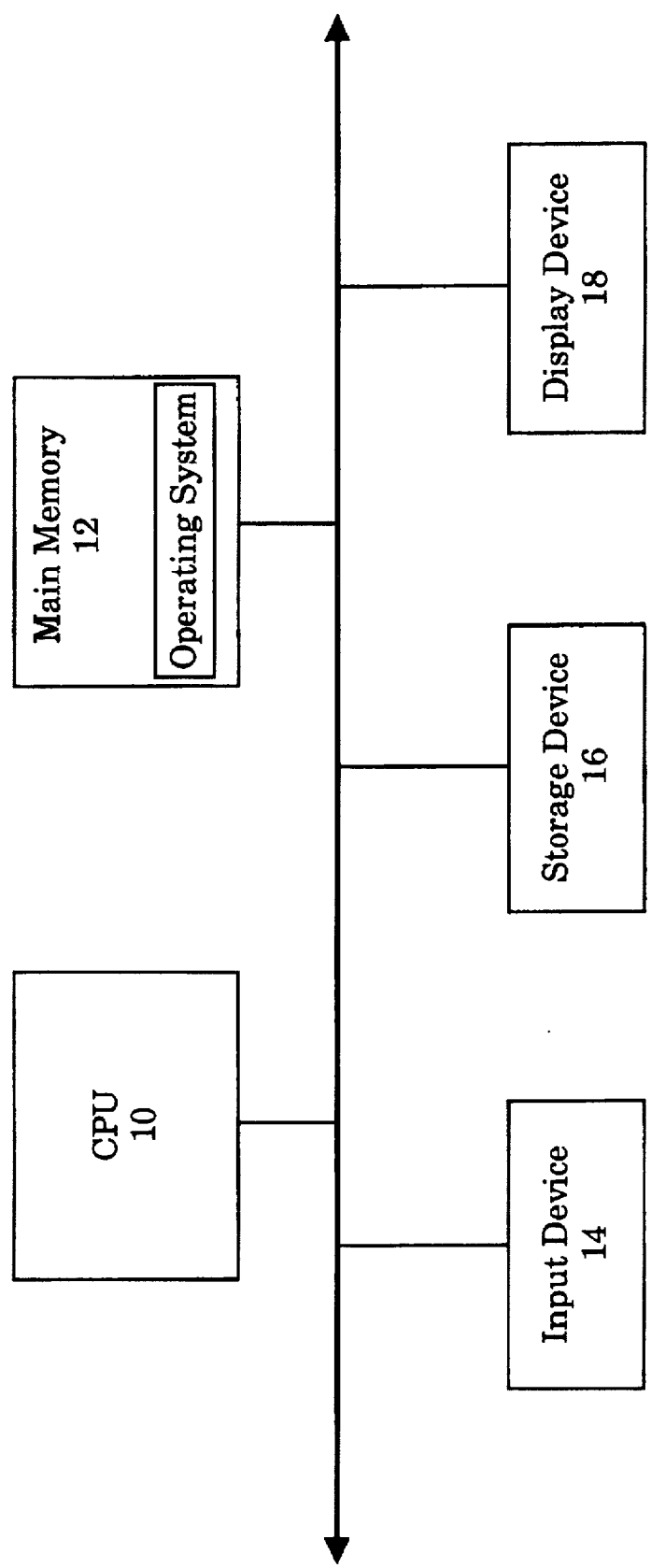
FIG. 2 illustrates a block diagram of a computer system.

FIG. 2 illustrates a block diagram of a computer system that is intended to encompass a broad class of computer devices such as workstations, personal computers, and handheld computer devices. The core of computer system of FIG. 2 comprises a central processing unit 10 and a memory unit 12. Also coupled to the computer system are a set of I/O devices such as input device 14, storage device 16, and display device 18.

To control the operation of the computer system in FIG. 2, the central processing unit 10 runs an operating system that is mainly located in memory unit 12. Large operating systems also often need additional storage on external nonvolatile storage devices such as storage device 16.

In the preferred embodiment, the present invention comprises a rapid suspend operation for use with the UNIX operating system. The UNIX operating system is a multiprocessing operating system that runs several execution threads concurrently. To suspend the UNIX operating system, the suspend operation of the present invention must pacify the execution threads controlled by the UNIX operating system.

The UNIX Operating System

Figure 3:
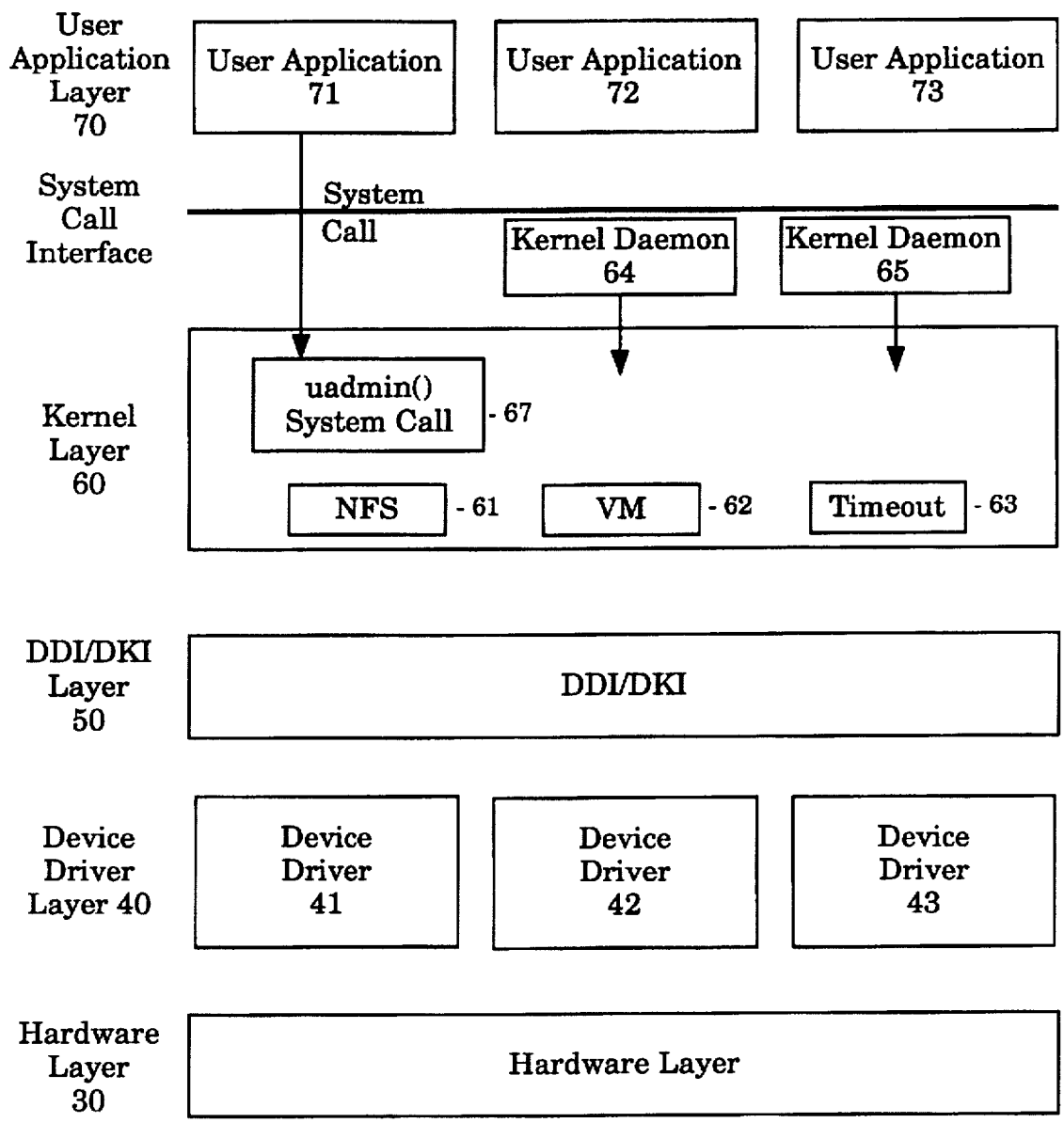
FIG. 3 illustrates a conceptual diagram of the UNIX operating system.

FIG. 3 illustrates a conceptual diagram of the UNIX operating system running on a computer system. As can be seen in FIG. 3, the UNIX operating system can be divided into a set of a hierarchical layers. At the very bottom of the UNIX operating system is a physical hardware layer 30. The hardware layer 30 consists of the actual computer hardware upon which the UNIX operating system running.

Immediately above the hardware layer 30 are a set of device drivers (41, 42, and 43) in a device driver layer 40. The device drivers are responsible for interacting directly with the hardware layer. Different device drivers control different hardware devices.

Above the device driver layer 40 is a Device Driver Interface and Driver Kernel Interface (DDI/DKI) layer 50. The DDI/DKI layer 50 provides an interface between a kernel layer 60 and the individual device drivers. The DDI/DKI layer 50 hides details about device drivers from the UNIX kernel.

Above the DDI/DKI layer 50 is the kernel layer 60 that contains the UNIX kernel. The UNIX kernel implements most of the functionality of the UNIX operating system. Within the kernel layer 60 are several operating system subsystems. For example, in current implementations of the UNIX operating system a network file system (NFS), a virtual memory manager (VM), and a timeout mechanism are implemented as operating system subsystems. Also within the kernel layer 60 are kernel daemons 64 and 65. The kernel daemons are execution threads run by the kernel to perform some specific activity. For example, a printer daemon may maintain a spool queue for a printer connected to the computer system. The kernel layer 60 interacts with the computer hardware by making calls to the device drivers (41, 42, and 43) through the DDI/DKI layer 50.

Finally, above the kernel layer 60 are the user application programs (71, 72, and 73). The user application programs interact with the UNIX operating system by making system calls to the UNIX kernel. The UNIX kernel processes each system call and returns a result to the user application program that made the system call.

Multi-Layer Quiescent Suspend Operation

The preferred embodiment of the present invention is implemented as a multi-step suspend procedure that rapidly shuts down a UNIX operating system and stores the UNIX operating system state on nonvolatile storage. In this manner, the state of the UNIX operating system can be quickly restored later. The suspend operation of the present invention shuts down the UNIX system in a top-down hierarchical manner. Referring to FIG. 3, the user application programs are suspended first, then the operating system subsystems are suspended, next the device drivers are suspended, and finally the suspended system state is written to nonvolatile storage.

The suspend operation of the present invention is accessible to user application programs using the existing uadmin( ) system call as illustrated in FIG. 3. To quickly suspend the computer system, a user application program calls uadmin( ) with the appropriate suspend parameters and the kernel will suspend the computer system.

Figure 4:
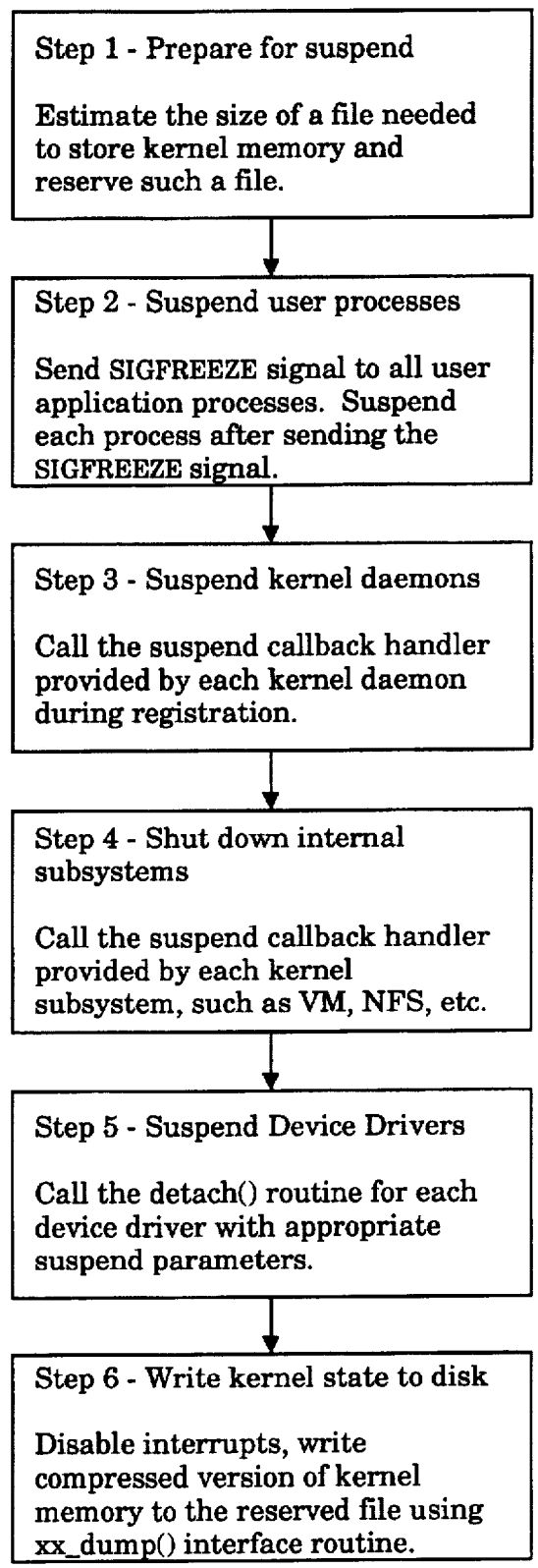
FIG. 4 illustrates a flow diagram that contains the steps performed by the fast suspend technique of the present invention.
Figure 5:
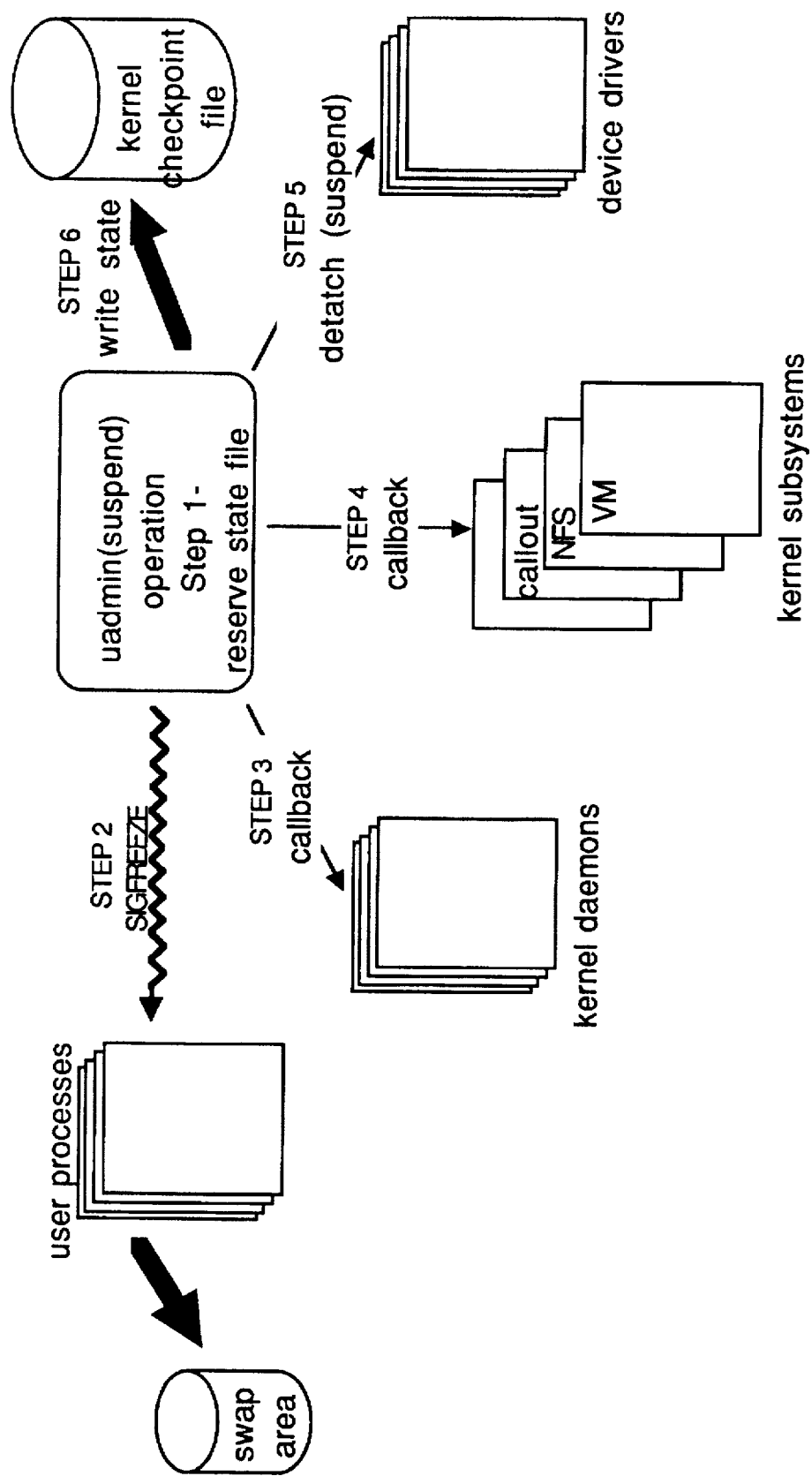
FIG. 5 illustrates a conceptual diagram of operations performed by the fast suspend operation of the present invention.

The suspend operation of the present invention can be implemented in six primary steps. FIG. 4 and FIG. 5 illustrate the six steps of the suspend procedure of the present invention. FIG. 4 lists the six steps in a flow diagram, while FIG. 5 illustrates the six steps in a conceptual manner. The six main steps of the suspend procedure will be explained with reference to both FIGS. 4 and 5.

The first step, Step 1, prepares a computer system for the suspend operation. The preparation step of swaps out memory pages used by the user application processes to nonvolatile storage and creating a file on the root file system that will store the current state of the UNIX kernel.

To swap out the memory pages used by the user application processes, the uadmin(suspend) system call accesses a daemon responsible for memory swapping. That daemon then swaps out all the memory pages used by the user applications.

The suspend operation of the present invention creates a kernel file by first estimating how much memory is used by the kernel. The suspend operation applies heuristics to determine how much the kernel memory can be compressed. The suspend operation then reserves a file of the compressed kernel size on the root file system.

When the suspend operation is later ready to write to the reserved file, the normal file system routines will no longer be available. To write to the reserved file, the suspend operation will use a primitive $xx_{13}$ dump( ) command. The xx__dump( ) command should be given explicit information as to where the information should be written. To provide this information, the suspend operation processes the reserved file with a xx__dmpctl( ) routine. The xx__dmpctl( ) determines the necessary displacement information for the reserved file such that the state file can later be dumped using the xx__dump( ) command.

The second step of the suspend procedure, Step 2, suspends all of the user application processes. Thus, the suspend procedure is starting at the top of the UNIX operating system hierarchy as depicted in FIG. 3. To stop each user application process the uadmin(suspend) system call sends a SIGFREEZE signal to all the user application processes. The SIGFREEZE signal is a signal that will be registered with UNIX Systems Laboratories (USL).

When a user application process receives the SIGFREEZE signal, the user application process should perform any operations needed to prepare for a system suspend. For example, a database server process that receives a SIGFREEZE signal should inform its clients of the impending system suspend. User application programs that do not need to prepare for a system suspend can ignore the SIGFREEZE signal. Programs written before the existence of the suspend procedure of the present invention will also ignore the SIGFREEZE signal. After a user application process handles the SIGFREEZE signal or ignores the SIGFREEZE signal, the kernel suspends that user application process.

Step 3 of the computer system suspend procedure is to notify all the kernel daemons that the system is being suspended. As illustrated in FIG. 3, daemons are execution threads owned by the kernel and they perform various housekeeping chores for the operating system such as maintaining a spool queue for a printer connected to the computer system.

The uadmin(suspend) system call notifies all the kernel daemons about the impending system suspend using a callback mechanism. A suspend callback routine is registered by each daemon that wishes to be notified of an impending system suspend when that daemon is started. Similar to the user application programs, the daemons that do not need to be notified of an impending system suspend do no need to register a callback routine with the kernel. When the daemons register a callback routine with the kernel process, each daemon registers the callback routine with a priority level. Later, when the system is shutting down, the kernel shuts down the daemons in an order starting with the lowest priority levels and finishing with daemons with the highest priority levels. In this manner, dependent daemons can be suspended in a proper order thus preventing deadlock.

After Step 3, when all the user application processes and the daemon processes have been suspended, there should be no new input or output activity since only the kernel and the device drivers remain active. Thus, the system should be in an inactive state.

After the user application processes and the daemons have been stopped, the kernel proceeds to suspend the various kernel subsystems at Step 4. To suspend the various kernel subsystems, the kernel calls each subsystem using a suspend callback address that was registered when the kernel subsystem was initially started. Similar to the daemon callback routines, each kernel subsystem callback routine is registered with a corresponding priority level. The kernel shuts down each kernel subsystem in an order dictated by the callback routine priority levels such that no deadlock occurs.

At Step 5, the uadmin(suspend) system call proceeds to suspend the layer of the UNIX operating system closest to the computer hardware, which is the device driver layer. The suspend operation suspends each device driver in the system. To suspend each device driver, the uadmin(suspend) system call makes a specific standardized DDI device driver call to each active device driver. In the present embodiment, the uadmin(suspend) routine calls a modified detach( ) routine that causes the device driver to prepare for a system suspend.

Upon receiving a detach( ) call with the appropriate suspend parameter, each device driver first stops processing incoming I/O requests. All current I/O requests are completed. Finally, each device driver is responsible for storing the state of the associated hardware device into kernel memory. If the device driver needs more memory, it can request more memory from the kernel. Later when the computer system is resumed, each device driver uses the stored hardware device state information to restore the state of the hardware device. Additional information on the modified detach( ) routine and corresponding attach( ) routine can be found in the disclosure of a copending patent application entitled "Method & Apparatus For A Power Management Pseudo-Device Driver", Ser. No. 08/200,676, filed and is hereby incorporated by reference.

After the user application programs, the daemons, the kernel subsystems, and the device drivers have been stopped, the computer system is completely inactive. At Step 6, the uadmin(suspend) routine writes all of the valid kernel memory pages to the disk.

Figure 6:
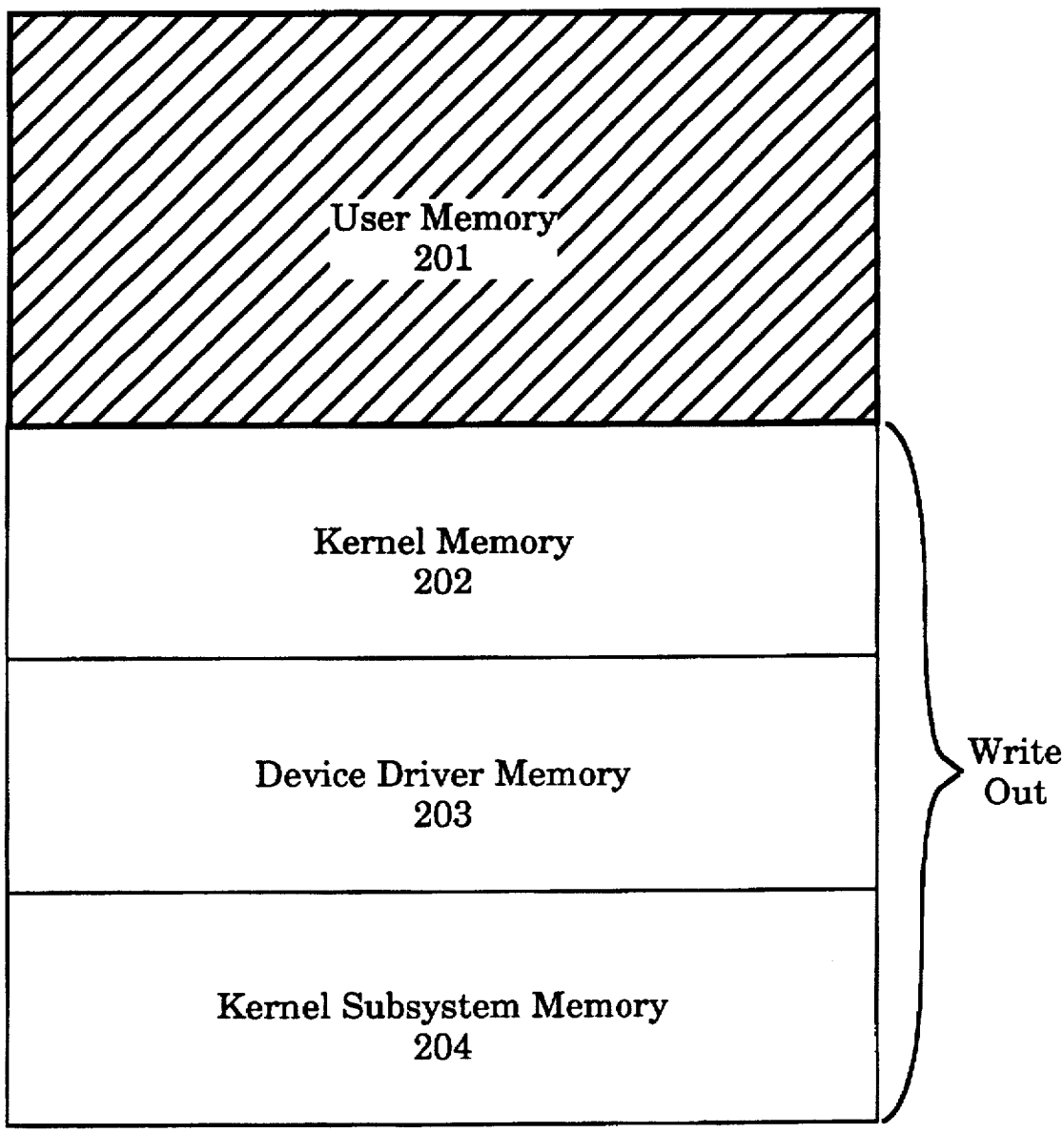
FIG. 6 illustrates a memory map of a computer running the UNIX operating system.

Referring to FIG. 6, a memory map of a computer running the UNIX operating system is illustrated. Since all of the user memory pages 201 have already been written out to the disk swap space, the user pages do not need to be written to the disk. Thus, the system only needs to write the memory pages owned by the kernel, the kernel subsystems and the associated device drivers.

To reduce the amount of space needed on the hard disk, the uadmin(suspend) routine compresses the data before writing the data out to the hard disk. The kernel state data is written to the file previously reserved on the root file system. By writing to the root file system, the kernel state data will be available upon boot up. It will be appreciated that when writing only a compressed version of the kernel state (and not the user application state), the system state file produced by the suspend operation of the present invention is much smaller than a state file stored by a shut down procedure that writes the entire main memory to a hard disk. For example, the kernel state file created by the present invention uses about one sixth of the amount of disk space required for other methods.

To write out the kernel memory, the present invention uses a primitive xx_dump( ) routine that already exists in the UNIX operating system. The xx_dump( ) routine was originally designed to perform memory core dumps when a computer system crashes. The xx_dump( ) routine writes information to a file using only information previously prepared by the xx_dumpctl( ) call in Step 1. Each kernel page is compressed as it written to the hard disk drive. After completing Step 6, the system is completely suspended and power can be removed.

Resume Operation

Figure 7:
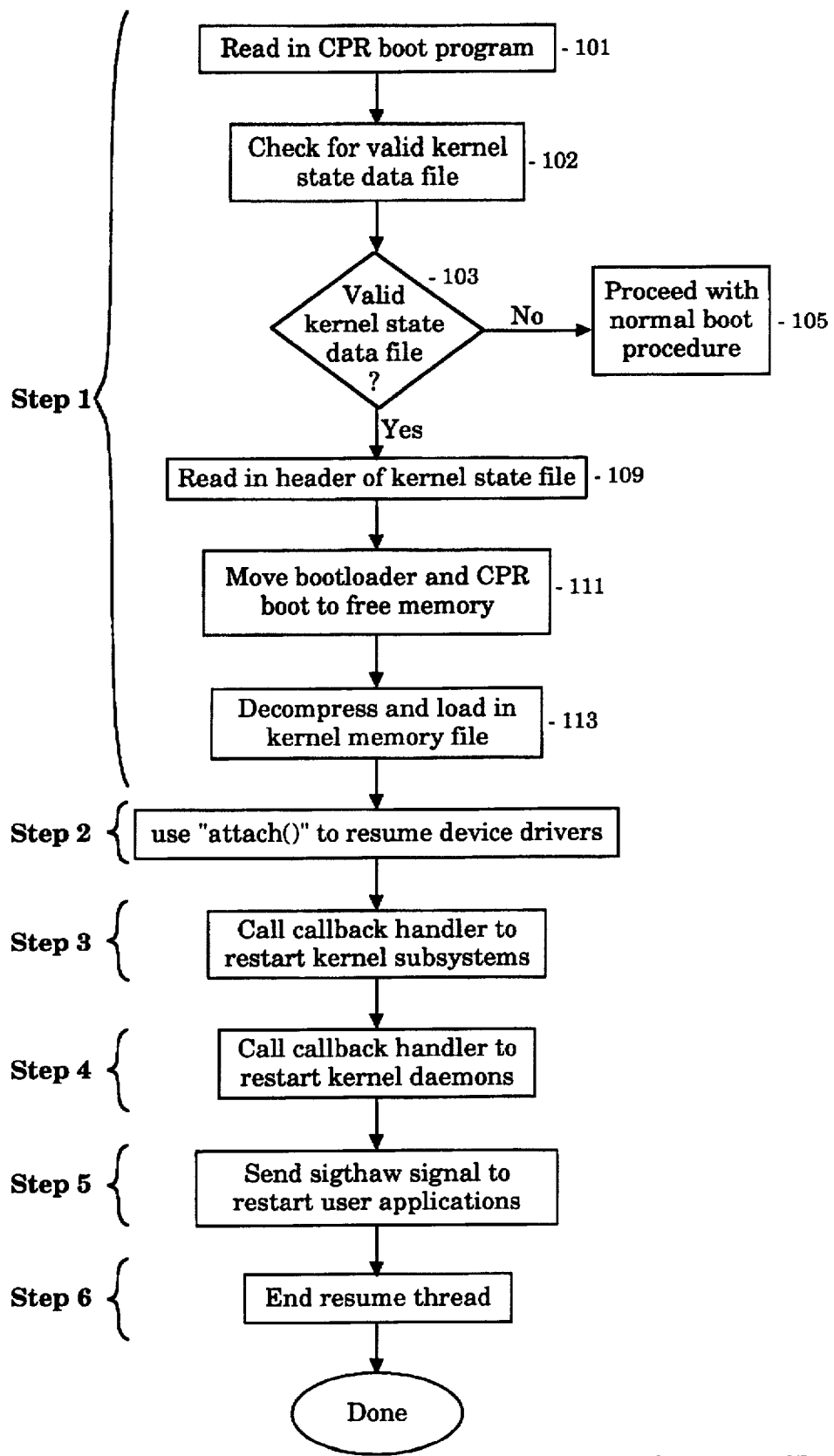
FIG. 7 illustrates a flow diagram that contains the steps performed by the resume operation of the present invention.

To resume a computer system that has been suspended using the suspend operation of the present invention, similar steps are performed in a reverse order. FIG. 7 illustrates the six main steps performed to resume a computer system that has been suspended using the suspend operation of the present invention.

The first step of resuming a suspended computer system is to read in the stored kernel memory file. When booting a computer system that uses the UNIX operating system, a Read Only Memory (ROM) starts the process by reading a boot block from the storage device that contains the root file system. The ROM reads a boot loader program from the storage device and then passes control to the boot loader program for further execution.

In the present invention, a special CheckPoint Resume (CPR) boot loader program is read in and executed by the regular boot loader program at substep 101 of FIG. 7. The CPR boot loader program checks to see if a suspended kernel state file is on the root device at substep 102 of FIG. 7. If the boot loader fails to detect a suspended kernel state file at substep 103, the system proceeds to substep 105 where the normal boot procedure takes over. However, if the boot loader detects a valid stored kernel state file at substep 103, the CPR boot program proceeds to load the suspended kernel state file into main memory resume the suspended system.

At substep 109, the CPR boot program requests the boot loader to load in a first section from the kernel state information file. The CPR boot loader then examines the contents of that first section to determine which pages of main memory will be occupied by the kernel when the kernel is loaded. At substep 109, the CPR boot program selects some pages of memory that will not be used by the kernel and then moves itself and the boot loader program to those free memory pages. After the CPR boot program and the boot loader program are moved out of the memory pages to be used by the kernel, the CPR boot program requests the boot loader to load in the remainder of the kernel state file at substep 111. As the boot loader loads in the kernel, the CPR decompresses each page and places it into the correct area of memory at substep 113.

After the kernel has been restored into main memory, the kernel resumes operation by restarting all of the processes and subsystems in the reverse order in which they were taken down.

Thus, the kernel restarts all of the device drivers at Step 2. To restart each device driver, the kernel issues an attach( ) command with special resume parameters to each device driver. Each device driver responds to the attach( ) command with resume parameters by restoring the associated hardware device to the exact state of the hardware device before the system was suspended. The device driver restores the hardware device's state using the hardware state information stored in memory right before the system was suspended. After all the device drivers have been restored, the computer system can now perform I/O operations.

Step 3 restarts the kernel subsystems that existed before the system was suspended. Each kernel subsystem is notified of the resume operation by executing a resume callback routine in each kernel subsystem. Each kernel subsystem is therefore given a chance to execute a setup code sequence before it is required to provide services.

After restarting the kernel subsystems, Step 4 restarts the various kernel daemons. Similar to the restart step for the kernel subsystems, the kernel executes a callback routine in each kernel daemon that informs the kernel daemon about the resume operation.

Finally, at Step 5, the kernel restarts the user application processes. Before restarting each user application process, the kernel issues a SIGTHAW signal to each user application process that allows the user application process to prepare for resumed operation. When a user application process receives the SIGTHAW signal, the user application process can restore any process state that was stored during the SIGFREEZE routine immediately before the user application process was suspended. After the SIGTHAW routine has been executed, the user application is restarted. At this point the entire computer system is back up and running as it was before the system was suspended.

Step 6, the final step of the resume operation, is to end the resume thread that restarted the system. The resume thread may simply terminate itself. Alternatively, the resume thread can convert itself into a login process or a "lockscreen" process in a windows system to enforce security.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A computer implemented method of suspending and saving a state of a computer system, said state of said computer system including information regarding a state of a multitasking operating system contained within said computer system memory at the time said computer system is suspended and saved, said method comprising the steps of:

preparing for said computer system suspension by allocating a space on a nonvolatile storage device for storing said saved state of said computer system;

alerting a set of user application processes running on said computer system regarding said computer system suspension such that said user application processes may perform clean-up operations before being suspended;

suspending said set of user application processes running on said computer system; and alerting a set of operating system subsystems running on said computer system regarding said computer system suspension by calling a callback suspend routine in each operating system subsystem such that said operating system subsystems may perform clean-up operations before being suspended;

suspending said set of operating system subsystems running on said computer system after having suspended said user application processes; and writing said information regarding said state of said operating system from said computer system memory onto said nonvolatile storage device.

2. The computer implemented method as claimed in claim 1 further comprising the step of:

writing out at least one memory page used by at least one user application process onto said nonvolatile storage device.

3. The computer implemented method as claimed in claim 1 wherein said step of writing a state of an operating system in a memory of said computer system onto a nonvolatile storage device comprises writing a compressed version of said operating system to said file reserved on said nonvolatile storage device.

4. The computer implemented method as claimed in claim 1 wherein said step of suspending user application processes running on said computer system comprises sending a signal to said user application processes that warns said user application processes that said computer system will be suspended, said user application processes invoking a suspend signal handling routine.

5. The computer implemented method as claimed in claim 1 wherein said steps of alerting a set of operating system subsystems and suspending said operating system subsystems comprises calling a callback suspend routine in at least one kernel daemon that warns said kernel daemons that said computer system will be suspended.

6. The computer implemented method as claimed in claim 1 wherein said steps of alerting a set of operating system subsystems and suspending said operating system subsystems further comprises calling a callback routine in at least one kernel subsystem, said callback routine warns said kernel subsystem that said computer system will be suspended.

7. The computer implemented method as claimed in claim 1 wherein said steps of alerting a set of operating system subsystems and suspending said set of operating system subsystems running on said computer system comprises calling a suspend routine in each device driver on said computer system, said suspend routine saves a state of an associated hardware device.

8. A computer implemented method of resuming operation of a suspended computer system, said method comprising the steps of:

reading a boot block on a root file system to obtain a boot loader program;

activating said boot loader program for retrieving a suspended computer system state file from a nonvolatile storage device; and restarting with said boot loader program a set of execution threads that were running on said suspended computer system before said computer system was suspended, said step of restarting comprising the ordered substeps of attaching a set of device drivers used by said operating system;

restarting a set of operating system subsystems used by said operating system by calling a restart callback routine each of said operating system subsystems; and reactivating a set of user application processes that were running on said computer system when said computer system was suspended.

9. The computer implemented method as claimed in claim 8 wherein said step of reading a state file containing a state of an operating system comprises the substeps of reading a subset of said state file with a loader program, said subset identifying a set of memory pages that said operating system will occupy;

determining a free memory space not in said set of memory pages that said operating system will occupy;

moving said loader program to said free memory space; and loading in said operating system from said state file.

10. The computer implemented method as claimed in claim 8 wherein said step of reactivating a set of device drivers used by said operating system comprises calling a routine in each device driver that restores a saved state of an associated hardware device.

11. The computer implemented method as claimed in claim 8 wherein said step of reactivating a set of operating system subsystems used by said operating system comprises calling a callback routine for each kernel daemon in a set of kernel daemons that warns said kernel daemons about said operating system resume.

12. The computer implemented method as claimed in claim 8 wherein said step of reactivating a set of operating system subsystems used by said operating system comprises calling a callback routine for each kernel subsystem in a set of kernel subsystems that warns said kernel subsystems about said operating system resume.

13. The computer implemented method as claimed in claim 8 wherein said step of reactivating a set of user application processes comprises sending a signal to each user application process.

14. A computer apparatus, said computer apparatus comprising the elements of:

a computer processor;

a memory unit coupled to said computer processor;

a multitasking operating system, portions of said multitasking operating system existing in said memory unit, said multitasking operating system and said computer processor for controlling said computer apparatus, said multitasking operating system comprising a set of operating system subsystem processes, each of said operating system subsystem processes including a callback suspend routine;

at least one user application process running on said computer processor;

a nonvolatile storage device coupled to said computer processor; and a suspend unit for alerting a set of execution threads including user applications and operating system subsystems regarding said computer apparatus suspension, said suspend unit also for suspending said user application processes, and for suspending operating system subsystem processes by calling said callback suspend routine after suspending said user application processes, and for storing a state of said multitasking operating system from said memory unit onto said nonvolatile storage device.

15. The computer apparatus as claimed in claim 14 wherein said multitasking operating system is the UNIX operating system.

16. The computer apparatus as claimed in claim 14 wherein said computer apparatus further comprises:

at least one hardware device coupled to said computer processor; and at least one device driver for controlling said hardware device, said device driver saving a state of said hardware device in said memory unit after receiving a suspend call.

17. The computer apparatus as claimed in claim 14 wherein said suspend unit writes a compressed version of said state of said multitasking operating system onto said nonvolatile storage device.

18. The computer apparatus as claimed in claim 14 wherein said suspend unit warns said user application processes running on said computer system before said computer system will be suspended.

19. A computer implemented method of suspending and then resuming a state of a computer system, said state of said computer system including information regarding an operating system contained within said computer system memory at the time said computer system is suspended and saved, said method comprising the steps of:

preparing for a computer system suspension by allocating a space on a nonvolatile storage device for storing said saved state of said computer system;

alerting a set of user application processes running on said computer system regarding said computer system suspension, said application processes performing any necessary clean-up; suspending said set of user application processes running on said computer system;

suspending a set of operating system processes running on said computer system by calling a suspend callback routine in each of said set of operating system processes after having suspended said user application processes;

writing said state of an operating system from said computer system memory to a state file located in said space on said nonvolatile storage device;

suspending said computer system;

reading said state file containing said state of said operating system from said nonvolatile storage device;

reactivating said set of operating system processes; and reactivating said set of user application processes running on said computer system when said set of execution threads were suspended.

20. The computer implemented method as claimed in claim 19 wherein said step of writing said state of said operating system from said computer system memory to said state file on said nonvolatile storage device includes a step of compressing said state of said operating system.

21. The computer implemented method as claimed in claim 20 wherein said step of reading said state of said operating system from said state file on said nonvolatile storage device includes a step of decompressing said state of said operating system.

* * * * *